United States Patent
Giridhar et al.

(10) Patent No.: US 10,193,649 B2
(45) Date of Patent: Jan. 29, 2019

(54) INTERFERENCE CANCELLING BLOCK MODULATION

(71) Applicants: Centre of Excellence in Wireless Technology, Chennai (IN); Indian Institute of Technology Madras, Chennai (IN)

(72) Inventors: Krishnamurthy Giridhar, Chennai (IN); Devar Sendilramkumar Subbiah, Ahmedabad (IN); Ayyar Arun Balavenkatasubramanian, Salem (IN)

(73) Assignees: CENTRE OF EXCELLENCE IN WIRELESS TECHNOLOGY, Chennai (IN); INDIAN INSTITUTE OF TECHNOLOGY MADRAS, Chennai (IN)

( * ) Notice: Subject to any disclaimer, the term of this patent is extended or adjusted under 35 U.S.C. 154(b) by 156 days.

(21) Appl. No.: 15/091,996

(22) Filed: Apr. 6, 2016

(65) Prior Publication Data
US 2016/0226614 A1    Aug. 4, 2016

Related U.S. Application Data

(63) Continuation-in-part of application No. 13/640,036, filed on Oct. 8, 2012, now Pat. No. 9,338,038.

(51) Int. Cl.
*H04Q 7/00* (2006.01)
*H04J 11/00* (2006.01)
*H04B 7/0452* (2017.01)

(52) U.S. Cl.
CPC ........ *H04J 11/0073* (2013.01); *H04B 7/0452* (2013.01); *H04J 11/0033* (2013.01)

(58) Field of Classification Search
CPC .. H04J 11/0073; H04J 11/0033; H04B 7/0452
USPC .................................................. 370/329, 330
See application file for complete search history.

(56) References Cited

U.S. PATENT DOCUMENTS

| | | | |
|---|---|---|---|
| 9,338,038 B2* | 5/2016 | Giridhar | H04B 7/0417 |
| 2008/0032630 A1* | 2/2008 | Kim | H04L 25/0224 |
| | | | 455/45 |
| 2013/0101062 A1* | 4/2013 | Giridhar | H04B 7/0417 |
| | | | 375/285 |

* cited by examiner

*Primary Examiner* — Chuong T Ho

(57) ABSTRACT

Embodiments herein disclose a method of enabling non-ICBM transmissions in the communication network. The method includes transmitting information of the number of receiver antennas at user equipments (UEs) intended to be scheduled by a transmitter in common resource elements, to a controller in the communication network. Further, the method includes receiving a number of non-Interference Cancelling Block Modulation (ICBM) transmissions from the controller. Furthermore, the method includes transmitting information indicating cell-identification numbers of participating transmitters, and corresponding index of ICBM precoder matrix of the participating transmitters to the UEs.

6 Claims, 7 Drawing Sheets

INTERFERENCE CANCELLING BLOCK MODULATION

FIELD OF INVENTION

This invention relates to wireless communication techniques, and more particularly to interference mitigation in wireless communication techniques. The present application is based on, and claims priority from an U.S. application Ser. No. 13/640,036 filed on 8 Oct. 2012, the disclosure of which is hereby incorporated by reference herein.

BACKGROUND OF INVENTION

Co-channel interference has been one of the major factors limiting the performance of systems reusing the spectrum. The techniques optimized for the stand alone single-cell case fail to deliver their gains in the presence of interference. This makes interference mitigation techniques, an essential aspect of systems employing spectral reuse.

Users, who are in the cell-edge region receive transmissions of multiple transmitters, hence they experience significant interference in a reuse-1 scenario

SUMMARY

Embodiments herein disclose a method for enabling communications in a communication network, the method comprising of a transmitter coding an input stream with a precoder matrix, wherein the transmitter has been assigned the precoder matrix; the transmitter transmitting the coded input stream to a receiver; and the receiver detecting the coded input stream using precoder matrices of transmitters present in the network. The unique precoder matrix may have static values or dynamic values, which may be assigned by a controller in the network to the transmitter or assigned the precoder matrix at the time of manufacture of the transmitter. The precoder matrix depends on a plurality of factors, the factors comprising number of free eigen directions; number of common eigen directions; and number of users in the network. The transmitter flattens the coded input stream before transmission. The receiver determines precoder matrices of all other transmitters using precoder matrix of the transmitter and groups the coded input stream into a vector, before detecting the coded input stream.

Also, disclosed herein is a communication network comprising a transmitter adapted for coding an input stream with a precoder matrix, wherein the transmitter has been assigned the precoder matrix; and transmitting the coded input stream to a receiver; and a receiver adapted for detecting the coded input stream using precoder matrices of all transmitters present in the network. The transmitter is adapted for flattening the coded input stream before transmission. The receiver is adapted for determining precoder matrices of all other transmitters using precoder matrix of the transmitter and for grouping the coded input stream into a vector, before detecting the coded input stream.

Disclosed herein is a transmitter in a communication network adapted for coding an input stream with a precoder matrix, wherein the transmitter has been assigned the precoder matrix; and transmitting the coded input stream to a receiver. The transmitter is adapted for flattening the coded input stream before transmission.

Disclosed herein is a receiver in a communication network adapted for detecting a received stream using precoder matrices of all transmitters preset in the network. The receiver is adapted for determining precoder matrices of all other transmitters using precoder matrix of the transmitter and for grouping the coded input stream into a vector, before detecting the coded input stream.

Disclosed herein is a transmitter in the communication network for transmitting information of the number of receiver antennas at user equipments (UEs) intended to be scheduled by a transmitter in common resource elements, to a controller in the communication network. Further, the transmitter receives a number of non-Interference Cancelling Block Modulation (ICBM) transmissions from the controller. Furthermore, the transmitter transmits information indicating cell-identification numbers of participating transmitters, and corresponding index of ICBM precoder matrix of the participating transmitters to their respective UEs scheduled.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Embodiments herein disclose an Interference Cancelling Block Modulation (ICBM), a new open-loop interference mitigation scheme where each transmitter is assigned with a predetermined precoder matrix. Only a finite set of matrices need to be used. They will be assigned to each transmitter in a pre-determined manner. Usually, interfering transmitters located adjacent to each other will be assigned different matrices, and the same matrix can be reused by non-adjacent transmitters. Each of the matrices used by the transmitters is an N×K matrix, known as the ICBM matrix. The matrices expand the symbols which are mapped in time and/or frequency by a factor of N/K while providing precoded sequences with low cross-correlation properties.

Figure 1:
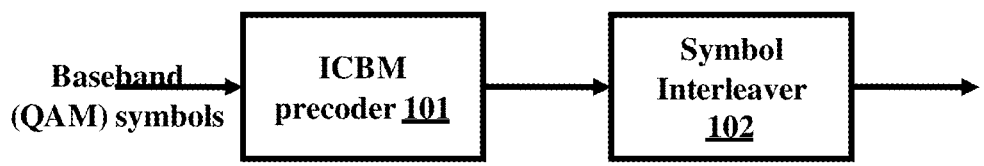
FIG. 1 depicts a transmitter, according to embodiments as disclosed herein.

FIG. 1 depicts a transmitter, according to embodiments as disclosed herein. The transmitter comprises of an ICBM precoder 101 and a symbol interleaver 102. The ICBM precoder is designed for a specific Signal to Interference Ratio (SIR) and number of users in the network m. There are two parameters—number of free eigen directions ($k_1$) and number of common eigen directions ($k_2$). Both these parameters depend on the SIR. $K=k_1+k_2$ and $N=mk_1+k_2$. The ICBM precoder 101 may have the values of K and N stored within it. The values of K and N may be sent to the ICBM precoder 101 by a controller present within the network. The values of K and N may be coded into the transmitter at the time of manufacture of the transmitter. The values of K and N may be static. In another embodiment herein, the values of K and N may be dynamic. The ICBM precoder 101 linearly maps a set of K baseband symbols to N baseband symbols. This implies that the ICBM precoder 101 expands the resources by a factor of N/K. The output of this rate K/N ICBM precoder 101 comprises of N complex symbols, where each of these symbols is a linear combination of the K input M-ary QAM symbols. A properly chosen symbol interleaver 102 ensures that the channel seen by the N symbols at the output of the ICBM precoder is flat. In another embodiment herein, the symbol interleaver 102 may be absent in the transmitter.

Figure 2:
FIG. 2 depicts a receiver, according to embodiments as disclosed herein.

FIG. 2 depicts a receiver, according to embodiments as disclosed herein. The receiver comprises of a Multiple Input, Multiple Output (MIMO) receiver 201, a de-interleaver 202 and a Maximum Likelihood (ML) Detector 203. The MIMO receiver 201 receives the input using at least one antenna and sends the received signals to the de-interleaver 202. The de-interleaver 202 groups the N symbols that were interleaved at the transmitter into a single vector. The ML detector 203 jointly detects the K symbols that were transmitted using the known ICBM matrices associated with all the transmitters in the network. The ML detector 203 may become aware of the ICBM matrix of the transmitter from the control signal sent by the transmitter while initiating the transmission. The ICBM matrices of the other transmitters for a given rate can be generated at the receiver, since only the position of the rows containing zeros varies in all the matrices. The receiver equations are given as follows:

Consider the following received signal model for a cell-edge UE over the four ICBM modulated symbols that is, over the 2×2 time-frequency grid shown in FIG. 2. Let the number of receive antennas be $N_r$. Therefore, we have, $$y_i = H_{ii}Q_i x_i + \sum_{\substack{j=1 \\ j\neq i}}^{M} H_{ij}Q_j x_j + n_i$$

where, $y_i$ is the (4 $N_r$)×1 received symbol vector obtained by stacking up the symbols received in the $N_r$ receive antennas at the four instants, $H_{ij}$ is the (4 $N_r$)×4 band-diagonal channel matrix over the four resource elements, $Q_j$ is the ICBM precoder used by transmitter$_j$, $x_j$ is the 2×1 baseband QAM symbol vector that was modulated by the ICBM precoder and $n_i$ is the (4 $N_r$)×1 additive white Gaussian noise vector at $UE_i$. The receiver has an MRC front-end. The ICBM demodulator stacks up the symbols received in the $N_r$ receive antennas from the four REs containing the ICBM modulated symbols. It performs MRC by multiplying the received symbol vector with $(H_{ii})^H$. This leads to the following equation.

$$\hat{y}_i = (H_{ii})^H y_i$$
$$= (H_{ii})^H H_{ii} Q_i x_i + \sum_{\substack{j=1 \\ j\neq i}}^{M} (H_{ii})^H H_{ij} Q_j x_j + (H_{ii})^H n_i$$

where, $\hat{y}_i$ is 4×1 vector. The ICBM demodulator takes $\hat{y}_i$ as its input and evaluates LLRs jointly for the two baseband QAM symbols in $x_i$. The LLR expression for the $m^{th}$ bit is given as follows.

$$LLR_m = \log\left(\frac{\sum_{x \in S_{0,m}} \exp\left[-\frac{(\hat{y} - H_{ii}^H H_{ii} Q_i x)^H R_i^{-1}(\hat{y} - H_{ii}^H H_{ii} Q_i x)}{2}\right]}{\sum_{x \in S_{1,m}} \exp\left[-\frac{(\hat{y} - H_{ii}^H H_{ii} Q_i x)^H R_i^{-1}(\hat{y} - H_{ii}^H H_{ii} Q_i x)}{2}\right]}\right)$$

where, $S_{0,m}$ and $S_{1,m}$ represent sets of all $\{x_i\}$ with 0 and 1, respectively in the $m^{th}$ bit position. The covariance matrix $R_i$ evaluated by $UE_i$ for computing the LLRs is given by, $$R_i = \sum_{\substack{j=1 \\ j\neq i}}^{M} (H_{ii}^H H_{ij}) Q_j Q_j^H (H_{ii}^H H_{ij})^H + \sigma^2 I$$

where, I is 4×4 identity matrix and $\sigma^2$ is the variance of thermal noise after MRC equalization.

In another embodiment herein, the de-interleaver 202 may be absent in the receiver.

Figure 3:
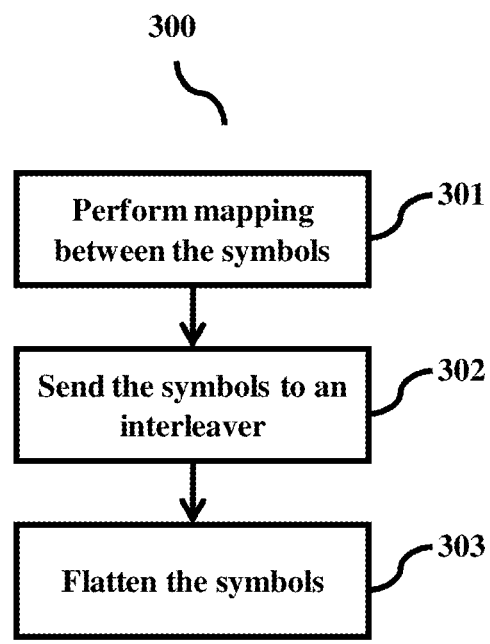
FIG. 3 depicts the process at a transmitter, according to embodiments as disclosed herein.

FIG. 3 depicts the process at a transmitter, according to embodiments as disclosed herein. The ICBM precoder 101 linearly maps (301) a set of K baseband symbols to N baseband symbols. By mapping the symbols, the ICBM precoder 101 expands the resources by a factor of N/K. The ICBM precoder 101 sends (302) the symbols to the interleaver 102. The symbols sent to the interleaver 102 comprises of N complex symbols, where each of these symbols is a linear combination of the K input M-ary QAM symbols. The interleaver 102 flattens (304) the symbols. The interleaver 102 may flatten the symbols by mapping the symbols to resources elements which are close-enough in time domain and/or frequency domain. The various actions in method 300 may be performed in the order presented, in a different order or simultaneously. Further, in some embodiments, some actions listed in FIG. 3 may be omitted.

Figure 4:
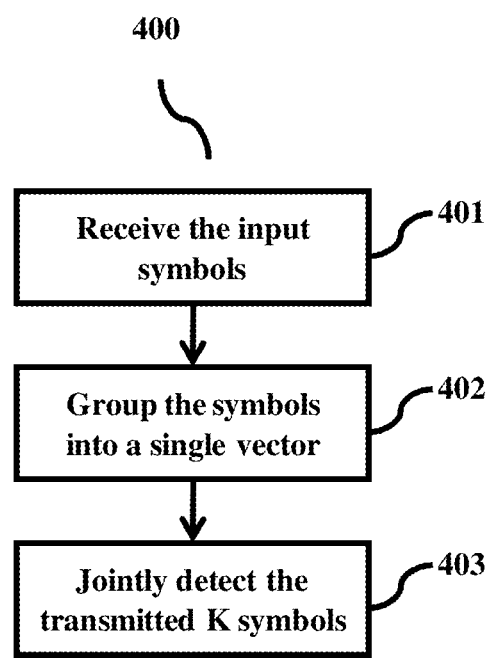
FIG. 4 depicts the process at a receiver, according to embodiments as disclosed herein.

FIG. 4 depicts the process at a receiver, according to embodiments as disclosed herein. The de-interleaver 202 receives (401) the N symbols from the MIMO receiver 201. The de-interleaver 202 groups (402) the received N symbols into a single vector. The de-interleaver 202 passes the vector to a ML detector 203. The ML detector 203 jointly detects (403) the K symbols that were transmitted using the ICBM matrices associated with the network. The various actions in method 400 may be performed in the order presented, in a different order or simultaneously. Further, in some embodiments, some actions listed in FIG. 4 may be omitted.

Consider an example where K=2 and N=4, hereby providing an ICBM scheme, with a rate of K/N=2/4. Here $k_1=1$ and $k_2=1$ and m=3. There are three matrices $Q_1$, $Q_2$ and $Q_3$ are defined as follows:

$$Q_1 = \begin{bmatrix} 1.09128 & -0.55595 \\ 0 & 0 \\ 0 & 0 \\ 0.32098 & 0.63006 \end{bmatrix}$$

$$Q_2 = \begin{bmatrix} 0 & 0 \\ 1.09128 & -0.55595 \\ 0 & 0 \\ 0.32098 & 0.63006 \end{bmatrix}$$

$$Q_3 = \begin{bmatrix} 0 & 0 \\ 0 & 0 \\ 1.09128 & -0.55595 \\ 0.32098 & 0.63006 \end{bmatrix}$$

For $k_1=2$, $k_2=1$ and m=2. K=3, N=5, the two matrices $Q_1$ and $Q_2$ are given as:

$$Q_1 = \begin{bmatrix} 0.7298 & -0.4963 & 0.6488 \\ -0.6238 & -0.9003 & 0.0129 \\ 0 & 0 & 0 \\ 0 & 0 & 0 \\ 0.3729 & -0.2673 & -0.6240 \end{bmatrix}$$

$$Q_2 = \begin{bmatrix} 0 & 0 & 0 \\ 0 & 0 & 0 \\ 0.7298 & -0.4963 & 0.6488 \\ -0.6238 & -0.9003 & 0.0129 \\ 0.3729 & -0.2673 & -0.6240 \end{bmatrix}$$

In the case of the Long Term Evolution (LTE) standards, each $i^{th}$ base station is assigned with one of the above-mentioned precoders $Q_i$ from the above-mentioned precoders. This is done similar to the assignment of offsets for Channel state Information-Reference Symbols (CSI-RS) to the base stations. While the offset assignment is done with modulo 6 on the cell-ids, the precoder assignment for ICBM is done with modulo 3. This ensures that most of the interference seen by a UE using a certain ICBM precoder matrix 101 is from base stations with a different ICBM precoder matrix 101.

Figure 5:
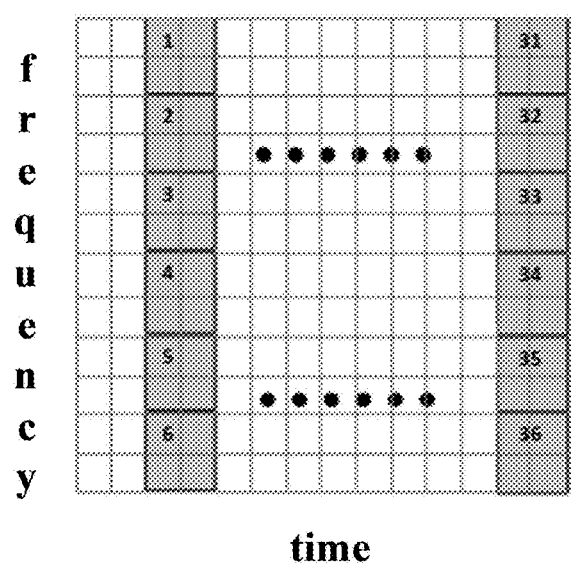
FIG. 5 illustrates the mapping of the ICBM symbols in frequency-time grid, according to embodiments as disclosed herein.

The symbol interleaver 102 ensures that the 4 symbols at the output of the ICBM 101 gets mapped to resources elements which are close-enough in time domain and/or frequency domain. As a result, the channel seen by the four symbols is flat. Since the mapping of symbols to LTE/LTE-A resource elements is done frequency-first, the interleaver 102 maps a set of four ICBM symbols to time-frequency grid as shown in FIG. 5, where {1, 2, . . . , 36} denote ICBM symbol indices.

Embodiments herein disclose an open-loop post-modulation technique, requiring minimum coordination among the various interfering transmitters. Embodiments herein disclose a method to generate a set of matrices to be distributed across multiple interfering transmitters employing ICBM. Embodiments herein disclosed improve the spectral efficiency of interference-limited users by dynamic or static co-operation between interfering transmitters. Embodiments herein disclose an alternate method to cancel/minimize interference when the number of interferers is greater than the number of antennas at the receiver. Embodiments herein disclosed can be designed for different rates depending on the number of interferers to be suppressed or any other performance metric rate that is limited by instantaneous or statistical interference profiles. Embodiments herein disclose can be configured between different transmitters such as macro-cellular base-stations, relays, micro/pico base-stations and/or femtocells to minimize interference across their individual coverage region. Hence the spectral efficiency of the system increases. Embodiments herein disclose can also be used on mobile transmitters on the uplink. Multiple mobile terminals can be scheduled to transmit simultaneously on the same resource (time and frequency) by employing enabling ICBM with a well designed precoder matrix.

Embodiments herein may be employed irrespective of the number of antennas at the transmitter and receiver. ICBM may be considered as a symbol-level encoder for interference cancellation and the rate K/N can be varied depending on the number of interferers or the throughput that is desired.

Figure 6:
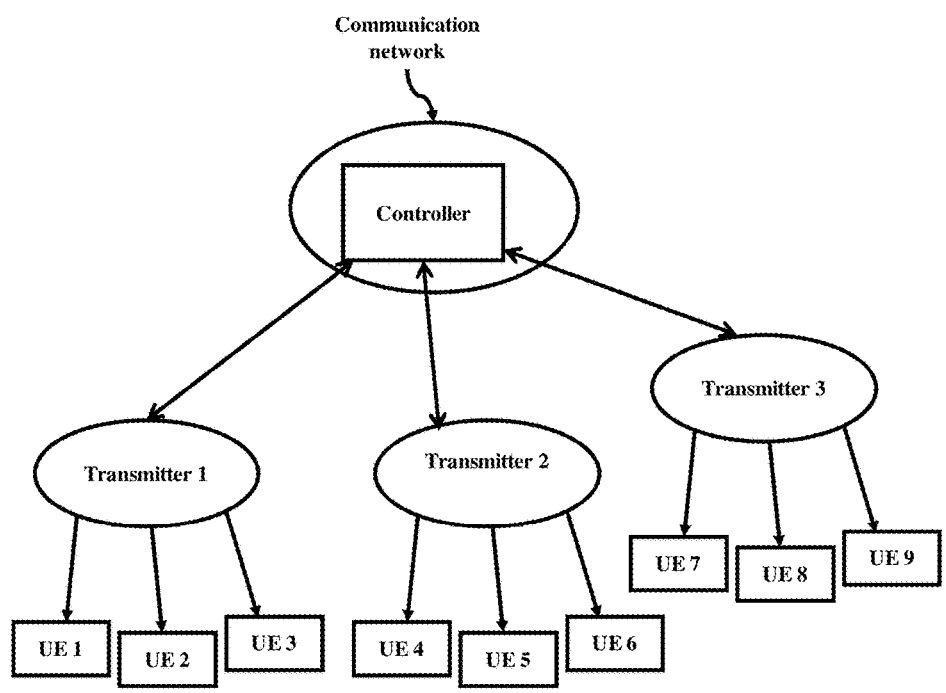
FIG. 6 shows a communication network in which a controller evaluates the number of non-ICBM transmissions and ICBM precoded transmissions, according to embodiments as disclosed herein.

FIG. 6 shows a communication network in which a controller evaluates the number of non-ICBM transmissions and ICBM precoded transmissions, according to embodiments as disclosed herein. As depicted in the FIG. 6, the transmitter 1 is serving UE 1, UE 2, UE 3, transmitter 2 is serving UE 4, UE 5, UE 6, and transmitter 3 is serving UE 7, UE 8 and UE 9. The controller in the communication network communicates with transmitters 1, 2 and 3 respectively. The non-ICBM transmissions refer to transmissions with no ICBM precoding involved.

In an embodiment, the transmitters 1, 2 and 3 transmits the information of the number of receiver antennas at the UEs served by each transmitter in the communication network. Further, the communication network disclosed enables non-ICBM transmissions along with ICBM transmissions in the common resource elements. In an embodiment, the common resource elements are resource blocks and the like.

In an embodiment, the controller evaluates the number of non-ICBM transmissions for the participating transmitters (transmitters 1, 2 and 3) based on a minimum number of receiver antennas among UEs served by the transmitters 1, 2 and 3 respectively.

In an embodiment, the controller evaluates a number of non-distinct ICBM precoder matrices for the participating transmitters based on a minimum number of the receiver antennas among UEs served by the transmitters 1, 2 and 3 respectively.

In an embodiment, the controller distributes the evaluated number of non-ICBM transmissions among the participating transmitters.

In an embodiment, the transmitter 1 transmits information indicating cell-identification numbers of the participating transmitters, and corresponding index of ICBM precoder matrix of the participating transmitters to the UEs 1, 2 and 3 respectively.

In an embodiment, the controller informs the transmitters 2 and 3 about the usage of ICBM precoder matrices by both the transmitters.

If N is the minimum number of receiver antennas among all the UEs intended to be scheduled in the common resource elements, then the controller evaluates N−1 non-ICBM transmissions for the participating transmitters.

If N is the minimum number of receiver antennas among all the UEs intended to be scheduled in the common resource elements, then the controller evaluates N−1 non-distinct ICBM precoder matrices for the participating transmitters.

In an embodiment, the controller distributes N−1 non-ICBM transmissions among the participating transmitters, where N is the minimum number of receiver antennas among all the UEs intended to be scheduled in the common resource elements.

Figure 7:
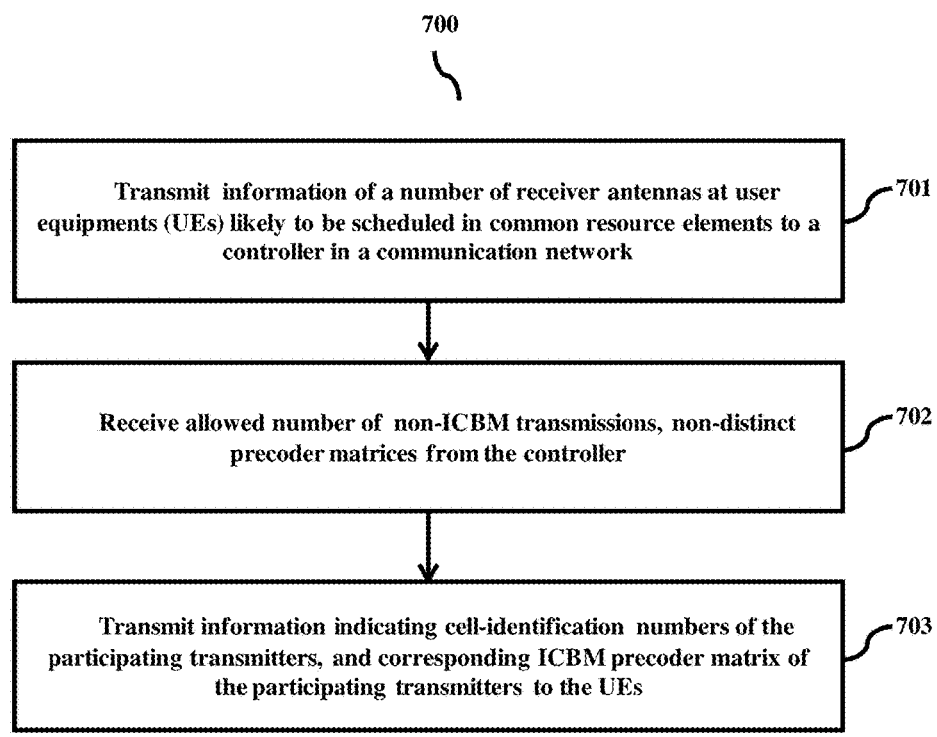
FIG. 7 is a flow diagram illustrating a method 700 implemented in the communication network for non-ICBM transmissions, and non-distinct ICBM precoder matrices, according to embodiments as disclosed herein.

FIG. 7 is a flow diagram illustrating a method 700 implemented in the communication network for non-ICBM transmissions and non-distinct ICBM precoder matrices, according to embodiments as disclosed herein. At step 701, the transmitter transmits the information of number of receiver antennas of the UEs likely to be scheduled in common resource elements served by it. At step 702, the transmitter receives from the controller allowed number of non-ICBM transmissions that the transmitter can transmit to the UEs. Further, the transmitter receives allowed number of non-distinct ICBM precoder matrices from the controller. At step 703, the transmitter transmits information indicating cell-identification numbers of the participating transmitters, and corresponding index of the ICBM precoder matrix of the participating transmitters to the UEs served by the transmitter.

In an embodiment, the controller evaluates the number of non-ICBM transmissions as N−1, where N is the minimum number of receiver antennas among all the UEs intended to be scheduled in the common resource elements.

In an embodiment, the controller evaluates the number of non-distinct ICBM precoder matrices as N−1, where N is the minimum number of receiver antennas among all the UEs intended to be scheduled in the common resource elements.

In an embodiment, the controller distributes N−1 non-ICBM transmissions among the participating transmitters, where N is the minimum number of receiver antennas among all the UEs intended to be scheduled in the common resource elements.

The method 700 and other description described herein provide a basis for a control program in a transmitter and the controller, which can be implemented using a microcontroller, microprocessor, or any computer readable storage medium.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A method for enabling communications in a communication network, the method comprising:
    transmitting, by a transmitter, information of the number of receiver antennas at user equipments (UEs) intended to be scheduled by said transmitter in common resource elements, to a controller in said communication network;
    receiving, by said transmitter, a number of non-Interference Cancelling Block Modulation (ICBM) transmissions from said controller; and
    transmitting, by said transmitter, information indicating cell-identification numbers of participating transmitters, and corresponding index of ICBM precoder matrix of said participating transmitters to said UEs, wherein said controller evaluates a number of non-distinct ICBM precoder matrices for said participating transmitters based on a minimum number of said receiver antennas among said UEs.

2. The method of claim 1, wherein said controller evaluates said number of said non-ICBM transmissions for said participating transmitters based on a minimum number of said receiver antennas among said UEs.

3. The method of claim 2, wherein said controller distributes said evaluated number of non-ICBM transmissions among said participating transmitters.

4. A communication network comprising:
    a transmitter configured to:
    transmit information of the number of receiver antennas at User equipments (UEs) intended to be scheduled by said transmitter in common resource elements to a controller;
    receive a number of non-Interference Cancelling Block Modulation (ICBM) transmissions from said controller; and
    transmit information indicating cell-identification numbers of participating transmitters and corresponding index of ICBM precoder matrix of said participating transmitters to said UEs, wherein said controller evaluates a number of non-distinct ICBM precoder matrices for said participating transmitters based on a minimum number of said receiver antennas among said UEs.

5. The communication network of claim 4, wherein said controller evaluates said number of said non-ICBM transmissions for said participating transmitters based on a minimum number of said receiver antennas among said UEs.

6. The communication network of claim 5, wherein said controller distributes said evaluated number of non-ICBM transmissions among said participating transmitters.

* * * * *